United States Patent [19]

Kakizaki et al.

[11] Patent Number: 4,526,401
[45] Date of Patent: Jul. 2, 1985

[54] ELECTRONIC CONTROL SYSTEM FOR ADJUSTABLE SHOCK ABSORBERS

[75] Inventors: Shinobu Kakizaki; Yoshifumi Yamamoto, both of Kanagawa, Japan

[73] Assignee: Atsugi Motor Parts Co., Ltd., Atsugi, Japan

[21] Appl. No.: 555,610

[22] Filed: Nov. 28, 1983

[30] Foreign Application Priority Data

Nov. 30, 1982 [JP] Japan .................... 57-210278
Dec. 15, 1982 [JP] Japan .................... 57-219933
Jan. 25, 1983 [JP] Japan .................... 58-10286

[51] Int. Cl.³ .................... F16F 9/44; B60G 9/00
[52] U.S. Cl. .................... 280/707; 188/299; 364/424
[58] Field of Search .............. 188/282, 285, 299, 315, 188/317, 319; 364/424; 280/707, 714

[56] References Cited

U.S. PATENT DOCUMENTS 3,420,341 1/1969 Keehn .................... 188/319
4,313,529 2/1982 Kato et al. .................... 188/299

FOREIGN PATENT DOCUMENTS

24635 2/1983 Japan .................... 188/319

Primary Examiner—Douglas C. Butler
Assistant Examiner—Alvin Oberley
Attorney, Agent, or Firm—Schwartz, Jeffery, Schwaab, Mack, Blumenthal & Evans

[57] ABSTRACT

An improved control system for electrically adjustable shock absorbers features a fault detector, a system-stop unit, and optional indicators and voltage-supply stabilization systems. The fault detector times the interval between an adjustment command from the operator and completion of the requested shock absorber adjustment, which is itself controlled by a feed-back system. If the adjustment is not completed within a predetermined period of time, the fault detector shuts down the control system via the system-stop unit and may illuminate the optional indicators. A stabilized power supply allows reliable use of the control system in hostile environments such as vehicles, and power-supply current limiting unit prevents electrical overloads in case of short-circuits or the like while facilitating detection of such electrical faults by the fault detector.

27 Claims, 13 Drawing Figures

ELECTRONIC CONTROL SYSTEM FOR ADJUSTABLE SHOCK ABSORBERS

BACKGROUND OF THE INVENTION

1. Field of the Invention

This invention relates to hydraulic shock absorbers mounted between the sprung portion and unsprung portion of a vehicle, and more particularly to a control system for adjustable-damping force hydraulic shock absorbers.

2. Description of the Prior Art

Conventionally, adjustable-damping-force hydraulic shock absorbers mounted between the sprung portion and unsprung portion of a vehicle have been proposed. The shock absorbers each include an adjusting element rotated by an electric motor to a desired angular position in accordance with the conditions under which the vehicle runs, thereby adjusting the damping force which the shock absorbers produce satisfactorily to improve driving comfort and stability. A switch selects the desired one of three "hard", "normal" (medium) and "soft" damping force setting positions. When the desired one of the three setting positions is selected, a selection reference signal generator accordingly produces a corresponding selection reference signal which is then compared by a comparator to a signal indicative of the angular position of an output shaft of the motor and hence the angular position of the adjusting element. If the reference signal is not equal to the angle-indicative signal, a signal indicative of this will be produced by the comparator, which causes the motor to rotate until the reference signal and angle-indicative signal match. This controls the rotation of the adjusting member within a cylinder, thereby adjusting the amount of hydraulic fluid which bypasses a damping passage between two hydraulic chambers, and hence the resistance of the fluid within the cylinder to displacement between the sprung and unsprung masses.

Occasionally, problems occur in the control device for a particular shock absorber; for example, the motor may seize, the harness for the motor may break, or the detector which senses the angular position of the motor may malfunction. In such cases, the shock absorbers which are controlled by the faulty control device and by the remaining, working control devices may differ in regard to the adjustable damping force. For example, even if three of the shock absorbers associated with working control devices may be set to the desired damping-force setting, the other shock absorber associated with faulty control device may remain in an undesired state. In that case, the unequal damping forces among the shock absorbers will degrade the driving stability of the vehicle if the differences among the damping forces are great.

In the above shock absorbers, on the other hand, the motor is driven to rotate the adjusting member such that an opening in the adjusting member is aligned with a desired one of a plurality of orifices in the stud, thereby establishing a desired damping force, as briefly mentioned above. For that purpose, the motor must be stopped accurately at the desired angular position. However, the motor and the adjusting member driven by the motor have noticeable moments of inertia, so that after the supply of driving current to the motor has stopped, the motor and the adjusting element will rotate unnecessarily due to their inertia. As a result, the desired orifice in the stud and the opening in the adjusting member may not exactly align, so that the desired damping force may not be achieved.

Furthermore, if the motor which drives the adjusting element is frozen, or the output terminals of the motor driving unit are short-circuited for some reason, excess current will flow from the power supply to the motor, so that the harness between the motor and the motor driving unit may overheat and burn, or that the motor driving unit itself will overload and hence be damaged.

A detector which senses the angular position of the motor is provided near, or integral with, the associated shock absorber for that purpose. In addition, the rest of the control device including the comparator, the motor driving unit, the selection switch, etc., is disposed in the vehicle compartment or behind the instrument panel as is the case with the controllers for other electrical equipment installed in the vehicle. In other words, the detector and the rest of the control system are separated from each other. Since the source of electric power will be provided with the rest of the control system, electric power must be supplied to the detector via electrical wiring. If a short-circuit occurs in the wiring, the wiring and other harness may be burnt. Furthermore, if the detector cannot perform its sensing function because of problems in the power supply system, the damping-force control device may continuously drive the motor.

The power which drives the loads such as the motor is usually derived from the battery or a generator mounted on the vehicle. However, the voltage of such sources of power is very likely to fluctuate, so that the driving force for the motor will not be constant. This is likely to occur during operation of the vehicle and is also likely to be influenced by high-voltage surges peculiar to the vehicle, which constitute a defect in terms of control. As an example, this may result in fluctuations in reference signals supplied from a selection reference signal generator to a comparator, thereby causing the control system to operate in an unstable manner. Furthermore, operation of other elements of the electrical system, such as switching off the starter motor, may produce a counterelectromotive force of, for example, hundreds of volts which may greatly damage the electrical elements of the control system.

SUMMARY OF THE INVENTION

It is an object of this invention to provide a control system for the shock absorbers which detects abnormal adjustment of the damping force of the shock absorbers and which forces the shock absorber to assume a predetermined damping-force level.

This invention provides a control system for shock absorbers which includes a plurality of damping-force adjusting means and a switch for selecting a desired one of "hard", "normal" and "soft" damping-force levels. A selection reference signal generator is responsive to operation of the switch to produce a corresponding damping-force selection reference signal. Drive means drives the damping-force adjusting means of the shock absorbers to a desired position in accordance with the reference signal to produce the desired damping force in each shock absorber. Means is provided for sensing the position of the damping-force adjusting means and producing a detection signal indicative of the position of the damping-force adjusting means. The drive means includes a comparator for comparing the reference signal with the detection signal and generating a non-coincidence signal when the reference signal does not coincide with the detection signal, thereby driving the damping-force adjusting means until the reference signal and the detection signal coincide, and generating a coincidence signal when the reference signal and the detection signal coincide, thereby stopping the driving of the damping-force adjusting means. A fault detector outputs an abnormality signal indicative of abnormal adjustment of at least one of the shock absorbers when the time interval between the beginning and the end of the damping-force adjustment by the damping-force adjusting means exceeds a predetermined value. A damping-force switching signal generator is responsive to the abnormality signal from the fault detector for compulsively switching the damping-force selection reference signal from the selection reference signal generator to a normal (medium)-damping-force selection reference signal, thereby driving the damping-force adjusting means to a corresponding position. That is, although the faulty control device may be in any one of the "hard", "normal" or "soft" damping force conditions, the difference in damping force between the faulty control device and the working control devices will be at most one level of change, so that the driving stability will not greatly be affected. The drive means includes an electric motor for driving the adjusting element and a drive unit for driving the electric motor in accordance with the selection reference signal. An optional braking unit is responsive to the coincidence signal for braking the electric motor, thereby stopping the adjusting means exactly at a desired damping-force setting position.

The control system may include a current limiting unit disposed between the motor drive unit and the motor for sensing the magnitude of the drive current supplied from the motor drive unit to the motor and limiting the magnitude of the motor drive current when the sensed magnitude of the drive current exceeds a predetermined value.

The control system may include a damping-force indicator unit which comprises a plurality of indicators, one for each of the damping-force levels, one of the indicators being continuously lighted up in response to the selection of the corresponding one of the damping-force levels selected by the switch, and an abnormality indication control unit responsive to the abnormality signal from the fault detector for flashing the rest of the indicators while continuously lighting the first of the indicators.

The control system may include an electric-current limiting unit provided between the sensing means and a power supply for preventing excess increase in the electric current supplied to the sensing means by the power supply.

The current limiting unit includes a current detector for sensing the magnitude of a current between the sensing means and the power supply, and a current control means responsive to the sensed magnitude of the current for decreasing the magnitude of the current when the sensed magnitude of the current exceeds a predetermined value, thereby preventing overload on the power supply. The current limiting unit may include a smoothing unit for smoothing the output of the current control means. The control system may also include means for absorbing external voltage surges both within and at the output of the limiting unit.

The control system includes a stabilized power supply means for the drive means and other electrical loads in the control system, the stabilized power supply means including a power supply, a high-voltage absorbing unit connected to the power supply for shunting voltage surges exceeding a predetermined value past the drive means and other electrical load in the control system, a reverse-current preventive means connected to the absorbing unit for preventing reverse polarity surge currents from flowing from the power supply to the drive means and othe electrical loads in the control system, a voltage regulator connected to the reverse-current preventive means for regulating the voltage to the drive means and other electrical loads in the control system and means connected to the voltage regulator for compensating for possible sudden changes in the current flowing through the drive means and/or other electrical load in the control system.

The object, features and advantages of this invention will be apparent from the following description of the preferred embodiments of this invention when taken in conjunction with the accompanying drawings.

DETAILED DESCRIPTION OF THE PREFERRED EMBODIMENTS

A preferred embodiment of a control system S for shock absorbers according to this invention will be described with reference to FIG. 1. The control system includes a switch 1 which selects a desired one of three damping-force setting positions H, N and S, which represent "hard", "normal" (medium) and "soft" levels of damping force and hence riding comfort. A selection reference signal generator 2 produces a selection reference signal corresponding to the selected switch position and supplies it to four control devices, each of which includes a comparator 3, a motor drive unit 5, an electrical motor 4, an angular position detector 6, an optional digital to analog converter 7, and a current limiting unit 47. In the figure, only three control devices are shown. Each comparator 3 compares the reference signal to a detection signal indicative of the angular position of the output shaft 4a of a corresponding electric motor 4. Comparator 3 outputs a coincidence signal and a non-coincidence signal when the compared signals coincide and disagree, respectively. Each drive unit 5 drives the corresponding motor 4 in response to a non-coincidence signal until a coincidence signal is received. Angular position detector 6 associated with a corresponding motor output shaft 4a senses the angular position of motor output shaft 4a and supplies a detection signal indicative of the angular position of the motor output shaft to the corresponding comparator 3 via a corresponding analog to digital (A-D) converter 7 when detector 6 is of the analog type such as a well-known potentiometer. If detectors 6 produce digital outputs, then the A-D converters 7 can be omitted. Driving one of the motors 4 results in driving the adjusting element 8 of the corresponding shock absorber T, the structure of which is illustrated in FIGS. 2 and 3.

Figure 2:
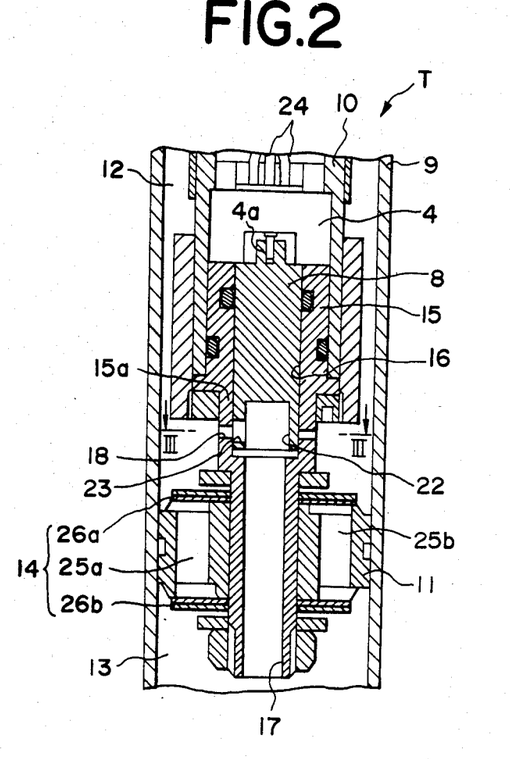
FIG. 2 is a cross-sectional view of the shock absorber.
Figure 3:
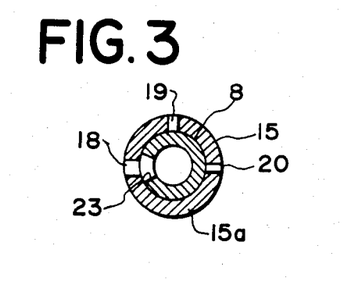
FIG. 3 is a view taken along the line III—III of FIG. 2.

In FIGS. 2 and 3, shock absorber T includes an closed cylinder 9 filled with a working hydraulic fluid, and a movable piston rod 10 which extends through an upper end of the cylinder. A piston 11 is disposed slidably within cylinder 9 and partitions the inside of cylinder 9 into two fluid chambers 12 and 13. Piston 11 is provided with a conventional damping-force generating means 14 which imparts a fluid resistance to the working fluid exchange between chambers 12 and 13. Means 14 includes a plurality of fluid passages 25a and 25b provided in piston 11, and a pair of resilient valve plates 26a and 26b. Upper plate 26a normally keeps the upper end of passage 25b closed, while leaving passage 25a open at all times. Conversely, lower plate 26b normally keeps the lower end of passages 25a closed while leaving passage 25b open. A hollow, stepped, cylindrical stud 15 connects piston rod 10 and piston 11. Stud 15 is provided with different-sized orifices 18, 19, 20 distributed around its circumferential wall, as best shown in FIG. 3. Each orifice communicates with upper fluid chamber 12. Adjusting element 8 is accommodated within the inner space 16 of stud 15 and driven via a motor output shaft 4a by motor 4 disposed within the inside space of piston rod 10. Adjusting element 8 has an axial recess 22 open toward lower chamber 13 and a communication opening 23 which can be aligned with any one of orifices 18, 19 and 20. An electrical harness 24 completes the electrical circuit between motor 4 and motor drive unit 5. When piston rod 10 and hence piston 11 move downwardly relative to cylinder 9, the fluid pressure in lower chamber 13 becomes higher than that in the upper chamber 12, so that fluid is forced out of the lower chamber 13 via passage 25b into upper chamber 12 while displacing the upper valve plate 26a upwardly to form an opening into upper chamber 12 to generate a substantial damping force. On the other hand, when piston rod 10 and hence piston 11 move upwardly relative to cylinder 9, the working fluid in upper chamber 12 moves into lower chamber passage 25a while displacing the lower valve plate 26b downwardly to form an opening into lower chamber 13 to generate a significant damping force.

A driver selects one of three "normal", "hard" and "soft" damping-force setting positions N, H and S by switching a switch 1 in accordance with the operating conditions of a vehicle to achieve the desired degree of riding comfort. In FIG. 1, the "normal" damping-force setting position is shown as being selected. Switch 1 produces a signal indicative of the selected setting position, "normal" in this case, to a selection reference signal generator 2 which then produces a corresponding selection reference signal. This signal is compared in a comparator 3 to a signal from the corresponding angular position sensor 6 indicative of the angular position of the output shaft 4a of the corresponding electric motors 4. The signal from sensor 6 may be converted to a corresponding digital signal by an analog-digital converter 7 where applicable. If the two signals coincide, a coincidence signal is produced; otherwise a non-coincidence signal is produced. If the coincidence signal is inputted to a motor drive unit 5, the supply of driving current from drive unit 5 to electric motor 4 will be stopped, so that rotation of motor 4 will stop. If, on the other hand, the non-coincidence signal is inputted to motor drive unit 5, the drive current will be supplied from drive unit 5 to motor 4, thereby driving motor 4 until the signal from comparator 3 switches to a coincidence signal.

Motor 4 drives output shaft 4a connected to adjusting element 8 until the opening 23 in element 8 is aligned with the desired one of the three different-sized orifices 18, 19 and 20 (FIG. 3) in stud 15. A proportion of the working hydraulic fluid determined by the selected orifice passes between two chambers 12 and 13 via a path defined by the selected orifice 18, opening 23, axial passage 22 in element 8 and an axial passage 17 in the stud 15. Thus, the damping force obtained by conventional damping-force generating means 14 which includes valve plates 26a and 26b can be decreased adjustably, which allows selection of a desired damping effect. The above of control system for adjustable shock absorbers of the preferred embodiment of this invention may be the same used in the prior art described in the introductory portion by this specification.

Figure 1:
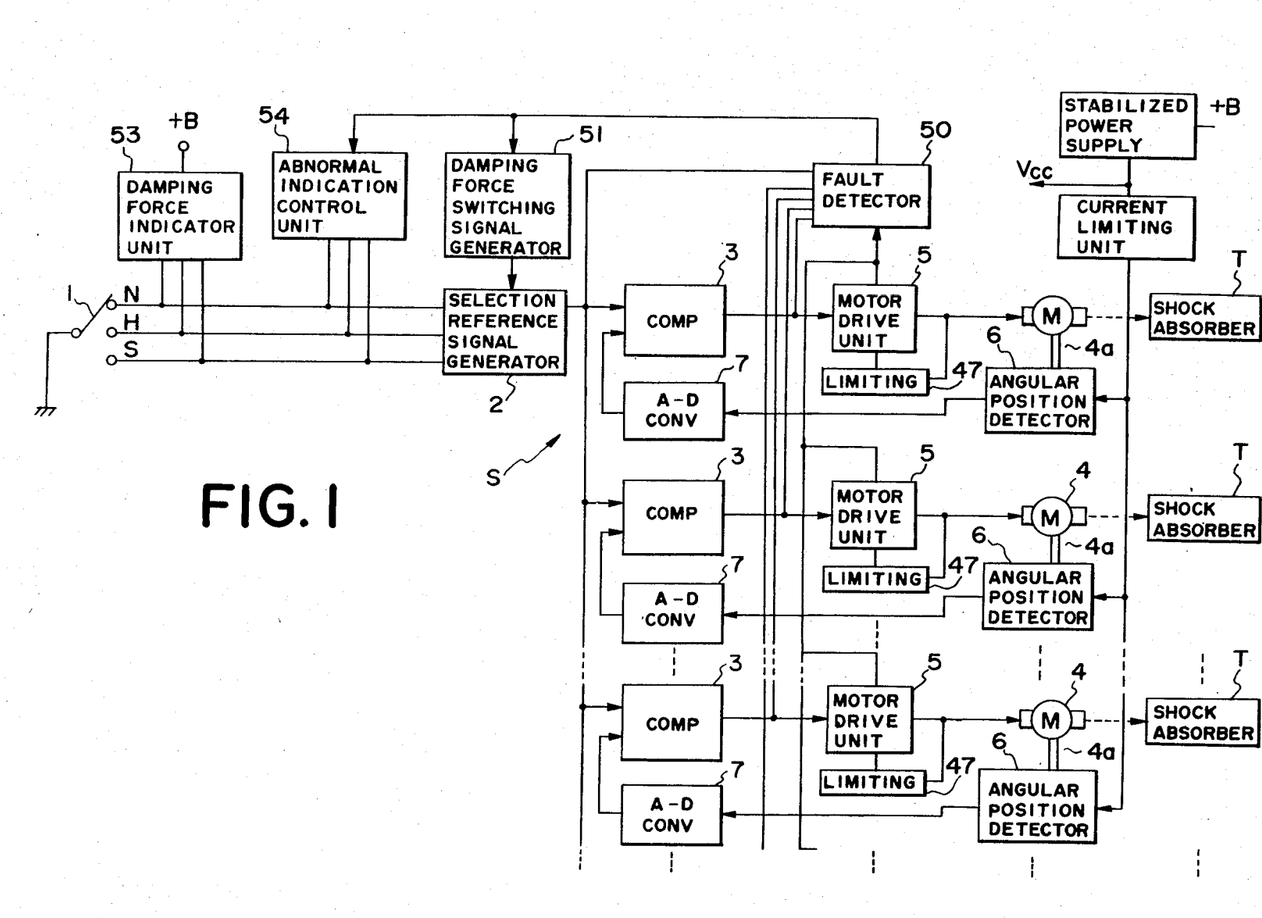
FIG. 1 is a block diagram of a preferred embodiment of a control system for shock absorbers according to this invention.

As can be seen in FIG. 1, the control system according to this invention further includes a current limiter 47, a fault detector 50, a damping-force switching signal generator 51, a damping-force indicating unit 53 and an abnormality indication control unit 54.

Figure 4:
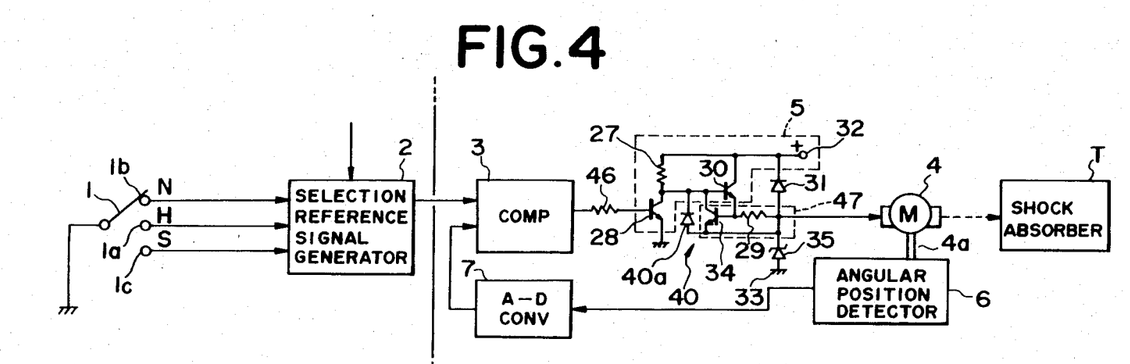
FIG. 4 is a block diagram of part of the control system of FIG. 1 in which the details of some components are diagrammed.

Referring to FIG. 4, motor drive unit 5 is provided between comparator 3 and motor 4. Motor drive unit 5 continues to supply a drive current from the terminal (+) of a power supply 32 to motor 4 for as long as comparator 3 outputs a non-coincidence signal. On the other hand, when comparator 3 outputs a coincidence signal, motor drive unit 5 stops supply of the drive current from power supply 32 to motor 4. A braking unit 40 may be provided which imparts a braking force to motor 4, thereby preventing unnecessary further rotation of the output shaft due to the motor's inertia after motor drive unit 5 has stopped supplying drive current to motor 4. Motor drive unit 5 includes a first transistor 28, the base of which is connected via a resistor 46 to the output of comparator 3, the collector of which is connected via a resistor 27 to power supply 32 and the emitter of which is grounded. Unit 5 also includes a second transistor 30, the base of which is connected to the collector of transistor 28, the collector of which is connected to power supply 32 and the emitter of which is connected to the input of motor 4 via a voltage-determining resistor 29.

Braking unit 40 in this particular embodiment includes a diode 40a provided between the collector of first transistor 28 and motor 4. A second diode 31 is provided between the terminal (+) of power supply 32 and motor 4 in order to protect drive unit 5 from surges in the circuit between second transistor 30 and motor 4 following the cutoff of drive current to motor 4.

Current limiting unit 47, provided between motor drive unit 5 and motor 4, prevents supply of excess drive current from power supply 32 to motor 4. In more detail, limiting unit 47 includes the resistor 29, one end of which is connected to the emitter of transistor 30 which supplies the drive current from the power supply to motor 4, and the other end of which is connected to the input of motor 4, and a third transistor 34, the base of which is connected to the junction of resistor 29 and the emitter of transistor 30, the collector of which is connected to the base of transistor 30, and the emitter of which is connected to the input of motor 4. In this embodiment, the emitter of transistor 34 is grounded via a constant-voltage zener or diode 35 which protects transistors 30 and 34 from damage due to surges in the circuit between transistors 30, 34 and motor 4.

In operation, when switch 1 is switched to a terminal 1b representing a "normal" setting position N, it produces a corresponding selection signal. A selection reference signal generator 2 outputs a selection command signal in response to the selection signal to comparator 3. Angular position detector 6 senses the angular position of motor output shaft 4a and produces a signal indicative of the angular position, which is also inputted via converter 7 where applicable to comparator 3 whereupon the two signals are compared. When the two signals do not coincide, and comparator 3 produces a low-level non-coincidence signal, the bias voltage applied to the base of transistor 28 decreases, so that transistor 28 is turned off. Thus, the drive current from power supply 32 is supplied via resistor 27 to the base of transistor 30, thereby turning transistor 30 on, so that the drive current is supplied from power supply 32 to the input of motor 4 via the collector-emitter path of transistor 30 and resistor 29, thereby driving motor 4. Rotation of motor output shaft 4a rotates adjusting element 8 within stud 15. Adjusting element 8 continues to be rotated until the output signal from angular position detector 6 coincides with the current corresponding selection reference signal.

When the opening 23 of adjusting element 8 is aligned with the desired orifice of stud 15 and as a result, comparator 3 outputs a high-level coincidence signal, the bias voltage on transistor 28 increases, thereby turning same on. Consequently, the base of transistor 30 is grounded via the emitter-collector path of transistor 28, thereby turning off transistor 30. This shuts off supply of the drive current from power supply 32 to motor 4. However, motor output shaft 4a has inertia, so that the motor shaft will continue to rotate, thereby generating electromotive force in motor 4. However, in this embodiment, braking unit 40 which includes diode 40a is provided between motor 4 and the collector of transistor 28, so that the electromotive force generated in motor 4 causes an electric current to flow via diode 40a and the collector-emitter path of transistor 28 to ground at 32, thereby consuming electrical energy. This imparts a braking force on motor 4. In summary, the instant the comparator 3 outputs a coincidence signal, motor 4 stops at the desired angular position, so that the opening 23 of adjusting element 8 remains in exact alignment with the desired orifice of stud 15.

Current limiting unit 47 prevents the drive current flowing from power supply 32 to motor 4 from increasing excessively and overloading the wiring to motor 4, or connecting motor 4 and motor drive unit 5, or transistor 30 of drive unit 5 which may occur if the motor shaft 4a freezes during rotation, or the output terminals of the motor are short-circuited for some reason. In more detail, when motor output shaft 4a becomes locked in place during its rotation and excess current flows through motor 4, a voltage greater than a predetermined value is generated across resistor 29, thereby turning on transistor 34, so that part of the base current of transistor 30 flows to the collector of transistor 34, decreasing the bias voltage on transistor 30 and the collector current at transistor 30 accordingly. That is, transistor 34 limits the drive current flowing from power supply 32 to motor 4 via transistor 30, thereby preventing damage due to overheating of motor 4 or the associated wiring.

Figure 5:
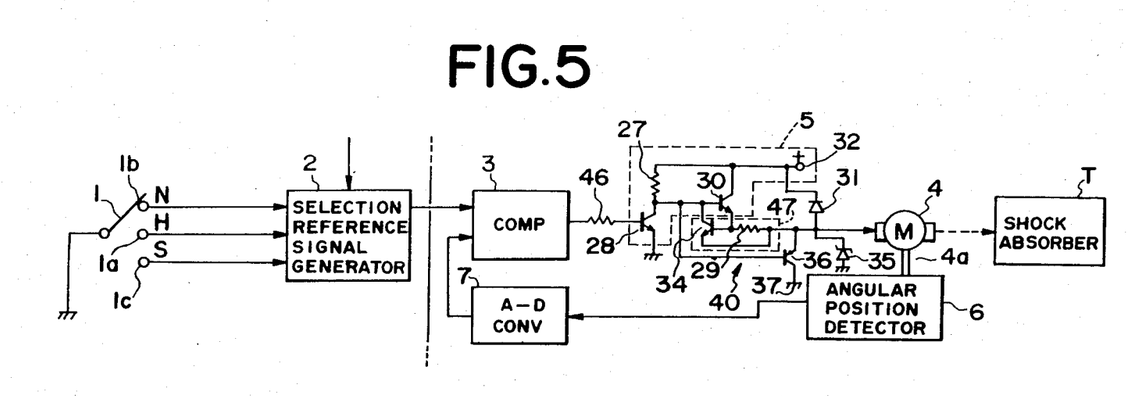
FIG. 5 is a block diagram of a modification of the embodiment of FIG. 4.

Although the braking unit 40 has been shown as including diode 40a, it is not limited to the structure shown in FIG. 4. For example, as shown in FIG. 5, a second transistor 36 may be provided between comparator 3 and motor 4 in place of diode 40a. This providion also imparts a braking force to motor 4. In more detail, as long as comparator 3 continues to output a non-coincidence signal, first and second transistors 28 and 36 are off. Thus, the drive current from the power source does not flow to ground at 37 via transistor 36, but is all supplied to motor 4 via transistor 30, thereby continuing to drive motor 4. On the other hand, when comparator 3 outputs a coincidence signal, transistors 28 and 30 are turned on and off, respectively, so that supply of drive current from power supply 32 to motor 4 is stopped and transistor 36 is turned on whereby the electromotive force generated in motor 4 due to its inertia causes a corresponding electric current to flow to ground at 37 via the emitter-collector path of transistor 36. This imparts a braking force to motor 4, so that motor 4 stops at the desired angular position.

A first fault detector 50 monitors the intervals between changes in the levels of the output signals of selection reference signal generator 2 and comparator 3. When the level of at least one of the output signals changes from high (steady-state) to low, time measurement begins. When the time interval from when the comparator output signal changes to low level until the output signal returns to high level exceeds a predetermined time interval, fault detector 50 outputs an high-level abnormality detection signal indicative of abnormal damping-force adjustment, referred to hereafter as "system abnormality". The high-level signal is sustained until the end of system operation such as switching off of the ignition switch. When damping-force switching signal generator 51 receives the abnormality detection signal from fault detector 50, it is compelled to produce the signal which would be obtained if the "normal" position N were selected by switch 1, thereby minimizing the difference between the damping forces in the faulty control device and in working control devices.

Figure 6:
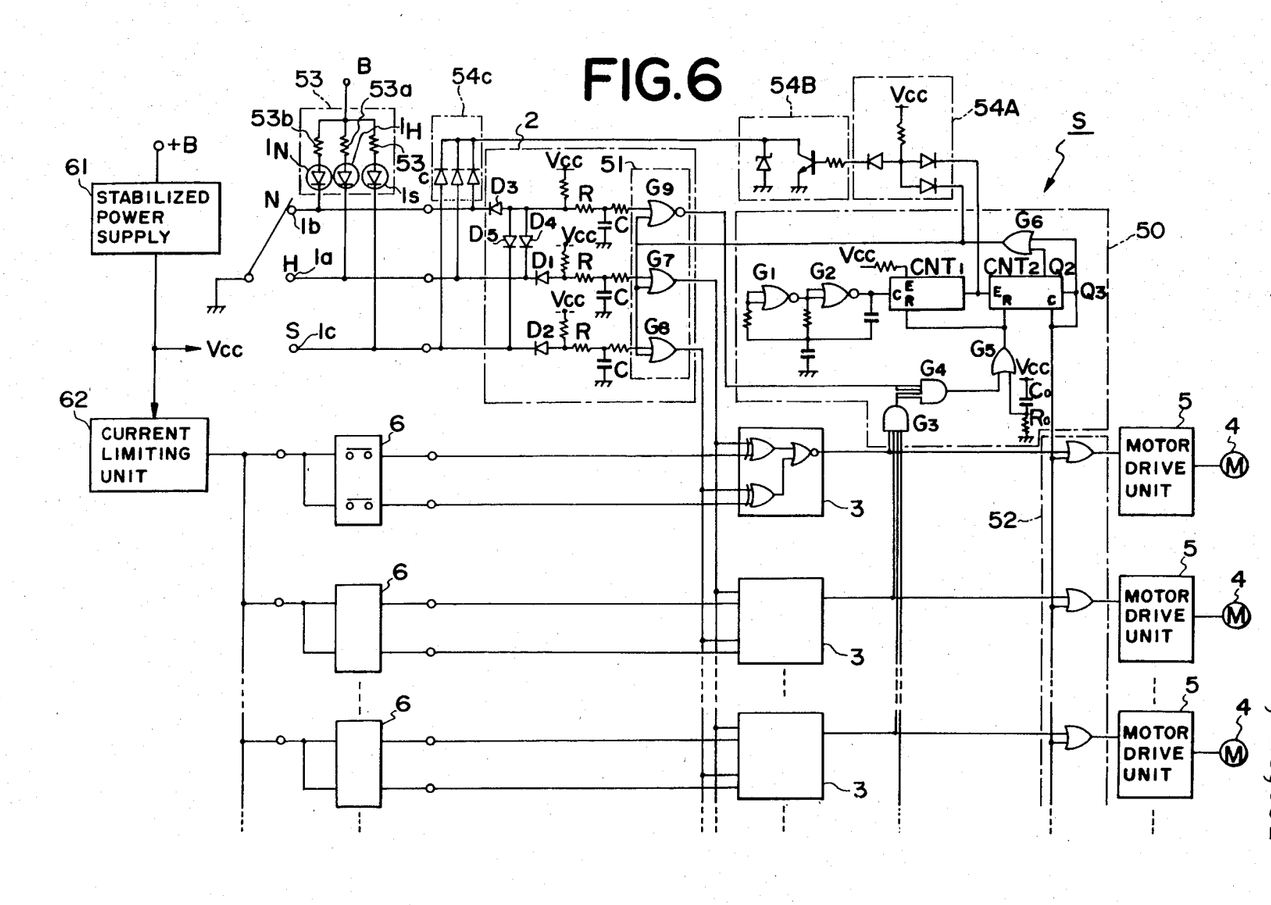
FIG. 6 is a block diagram of another part of the control system in which the details of some components are diagrammed.

FIG. 6 shows the details of an embodiment of this invention including fault detector 50 and damping-force switching signal generator 51. Fault detector 50 includes a conventional clock pulse generator which comprises NOR gates $G_1$ and $G_2$ used as inverters, and associated capacitors and resistors in a well-known oscillating configuration, two cascaded counters $CNT_1$ and $CNT_2$ which count pulses from the clock pulse generator, and an AND gate $G_3$ which detects whether or not at least one of comparators 3 is outputting a low-level or non-coincidence signal (which drives motor 4). An AND-gate $G_4$ outputs a low-level signal when either the output of AND gate $G_3$ or the signal outputted by selection reference signal generator 2 is at the lower level. An OR gate $G_5$ outputs a high-level signal in response to high-level outputs from either AND gate $G_4$ or a differentiating circuit consisting of a resistor $R_0$ and a capacitor $C_0$, which goes high when the operation of the system starts. The high-level output or OR-gate $G_5$ resets counters $CNT_1$ and $CNT_2$. An OR gate $G_6$ outputs a high level signal in response to high-level signals from either a time-setting bit $Q_2$ or the most significant bit $Q_3$ of counter $CNT_2$.

Counter $CNT_2$ receives the output of $CNT_1$, which functions as a frequency divider, at its enable terminal E, and its own $Q_3$ digit output at its clock terminal C. Thus, counter $CNT_2$ stops counting when its $Q_3$ bit output is at the higher level. The time interval required for counter $CNT_2$ to count up to its $Q_2$ bit is a built-in delay before detecting a system abnormality and the time interval required for counter $CNT_2$ to count from its $Q_2$ bit to its $Q_3$ bit should be long enough to allow the working control devices to return the corresponding shock absorbers to the "normal" state after the abnormality has been detected as will be described in more detail later. The $Q_3$ bit output is used as a stop command signal to a system stop unit 52 which is composed of OR gates each provided between the corresponding comparator 3 and drive unit 5.

Damping-force switching signal generator 51 is used as the output stage of selection reference signal generator 2 and is composed of OR gates $G_7$, $G_8$, and $G_9$, each of which receives as inputs the selection reference signal determined by switch 1 and the output of OR gate $G_6$ of fault detector 50. In selection reference signal generator 2, switch 1 grounds the selected switch terminal 1a, 1b or 1c (corresponding to "normal", "hard" and "soft" damping-force setting positions H, N and S). The terminals 1a and 1c are connected to input terminals of the corresponding and gate $G_7$ or $G_8$ via a back-flow preventing diode $D_1$ and $D_2$ and a noise-eliminating RC integrator while terminal 1b connected to one input terminal of a NOR gate $G_9$ via a back flow preventing diode $D_3$ and an RC integrator. In addition, logical-high voltage Vcc is applied to the mentioned input terminal of gates $G_7$, $G_8$ and $G_9$ via the RC integrators. These voltage supply lines can be grounded via the diodes $D_1$, $D_2$ and $D_3$ and the corresponding terminals 1a, 1c and 1b. In addition, diodes $D_4$ and $D_5$ connect the voltage supply for NOR gate $G_9$ to the terminals 1a, 1c while preventing current flow in the opposite direction.

Selection reference signal generator 2 produces a 2-bit output which consists of the outputs of OR gates $G_7$ and $G_8$ which depend on the selected switch 1 position, and produces a high-level output from NOR gate $G_9$ as long as one of the terminals 1a, 1b and 1c are grounded by the switch 1 and the output of OR-gate $G_6$ is low. The low-level output from NOR gate $G_9$ serves as a count-enabling input via AND gate $G_4$ and OR-gate $G_5$ to counters $CNT_1$ and $CNT_2$ of fault detector 50. Accordingly, the high-level output of NOR-gate $G_9$ indicates normal system operation, during which the counters $CNT_1$, $CNT_2$ are effectively disabled. However, if switch 1 malfunctions so that none of terminals 1a, 1b and 1c are grounded or if the output of OR-gate $G_6$ goes high, then the output of NOR-gate $G_9$ will go low, allowing the counters $CNT_1$ and $CNT_2$ to count continuously.

The selection reference signal generator 2 also outputs the aforementioned 2-bit signal to each of the comparators 3. The comparators 3 may consist of exclusive-or gates (XOR) connected for input to the OR gates $G_7$, $G_8$ and to the angular position detectors 6 and for output to a NOR-gate which in turn is connected for output to AND-gate $G_3$ and the corresponding OR-gate of system stop unit 52. Detectors 6 are responsive to the angular position of the motor shaft to output an encoded two-bit signal indicative thereof, shown schematically in FIG. 6. Specifically, the upper bit line of detector 6 is low when the motor shaft is in the "hard" position, the lower line likewise for the "soft" position, and both lines are high when the shaft 8 is in the "normal" position, and low when the shaft is between working positions. Thus, the output of detectors 8 will normally match the combined outputs of gates $G_7$, $G_8$ so that comparator 3 will output a high-level coincidence signal, disabling drive unit 5. On the other hand, when the outputs of an associated OR-gate and contact differ, e.g., when the "soft" state is selected via switch 1 but the motors have not yet moved the adjusting elements 8, then one XOR-gate will output a high-level signal, causing comparator 3 to output the low-level non-coincidence signal.

In operation, when switch 1 is switched to change the damping force from the current state to another, comparator 3 outputs a low-level non-coincidence output, so that counters $CNT_1$ and $CNT_2$ of fault detector 50 start to count. If any of the comparators 3 should continue to output a non-coincidence signal for longer than the time required for the $Q_2$ digit of counter $CNT_2$ to go high, the control system recognizes a system abnormality. The signal (high $Q_2$) indicative of system abnormality is passed via OR gate $G_6$ to gate $G_7$-$G_9$, thereby forcing both the outputs of gates $G_7$ and $G_8$ high, which creates the same conditions as those under which selection reference signals indicative of the "normal" position N are produced. This renders the output of Gate $G_9$ low, thereby causing counters $CNT_1$ and $CNT_2$ to continue to count. The comparators 3 produce non-coincidence outputs, which results in adjusting the damping force of the working control devices to "normal" position. After this control, the $Q_3$ digit of counter $CNT_2$ goes high, thereby stopping its counting and hence holding the $Q_3$ digit high. This forces the inputs to a system stop unit 52 high, thereby stopping all the control devices and motors.

Damping-force indicator unit 53 and abnormality indicator control unit 54 may be provided will be described next. The former unit 53 includes indicators 1H, 1N and 1S provided for damping-force selection terminals 1a, 1b and 1c, respectively, of switch 1. When one of damping-force selection positions H, N and S of switch 1 is selected, a corresponding one of terminals 1a, 1b and 1c is grounded, thereby continuously lighting a corresponding one of indicators 1H, 1N and 1S. Indicators 1N, 1H and 1S may each be a light-emitting diode or an electric bulb. Current-limiting resistors 53a, 53b and 53c may be provided in series with the diodes or bulbs 1H, 1N and 1S, respectively.

Abnormality indicator control unit 54 receives an abnormality signal from fault detector 50 when a system abnormality occurs, and continuously lights the indicator 1H, 1N or 1S associated with the switch 1 while flashing the remaining indicators, thereby ensuring that the operator, i.e., the driver, can quickly recognize the occurrence of abnormality. In the illustrated embodiment, unit 54 includes an AND gate 54A which receives the output of gate $G_6$ of fault detector 50 and the output of counter $CNT_1$, a buffer 54B which inverts and amplifies the output of gate 54A, and a diode circuit 54C which includes diodes, the anodes of which are connected to the inputs of selection reference generator 2 which are in turn connected to terminals 1a, 1b and 1c of switch 1, and the cathodes of which are connected in common to the output of buffer 54B.

In operation, when fault detector 50 detects a system abnormality, gate $G_6$ continuously generates a high-level output, while $CNT_1$ outputs a high-level signal at fixed intervals. As a result, AND-gate 54A periodically energizes transistor 54B, causing two of the indicators 1N, 1S and 1H to flash while the third, specifically the one grounded via switch 1, remains lit continuously. This provides a clear and easily noticeable method of indicating system abnormality. Note that although one of the inputs to each of the gates $G_7$, $G_8$ and $G_9$ is grounded, the other remains high continuously during abnormal system operation.

In the illustrated embodiment, system abnormalities are indicated by flashing two of the indicators 1H, 1N and 1S while illuminating a third which corresponds to the shock absorber state selected by switch 1. Thus, a special indicator which indicates only occurrence of an abnormality is not necessary. The circuit for indication of abnormalities utilizes periodically recurring pulses from fault detector 50, so that the circuit is composed by relatively few components, thereby resulting in a low cost.

Figure 7:
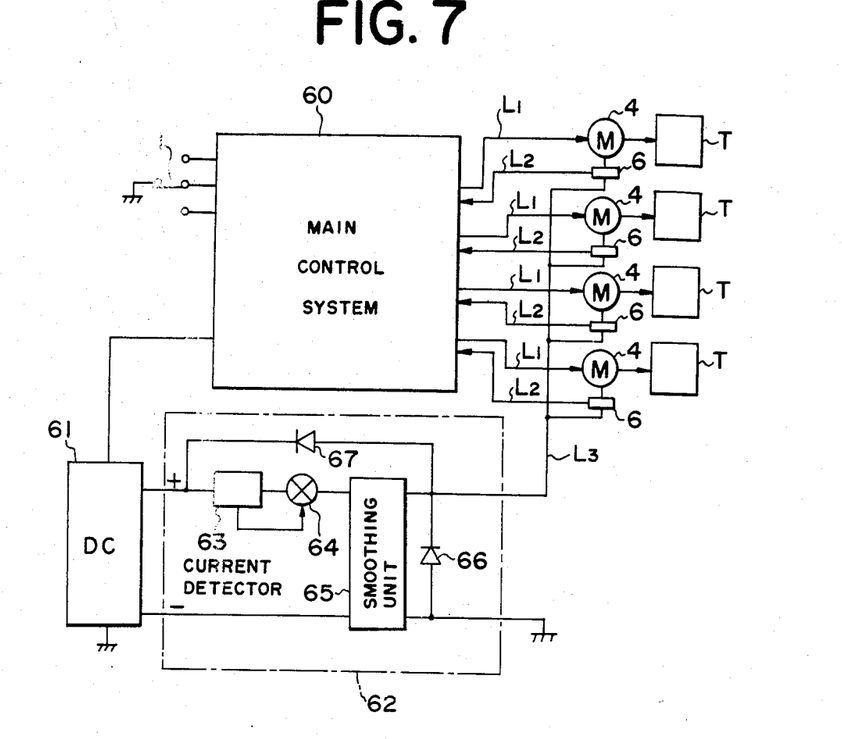
FIG. 7 is a block diagram of another configuration of the control system in which the current limiting unit is shown in detail.

The main portion of the control system, designated 60 in FIG. 7, includes selection reference signal generator 2, comparators 3, and motor drive units 5, as mentioned above and other components of the system of FIG. 1 which do not appear in FIG. 7. In FIGS. 1 and 4, the control system may include a stabilized d.c. power supply which feeds a constant voltage to the main portion of the control system and the angular position detector 6 via an electric-current limiting unit which prevents the flow of excess current from the stabilized d.c. power supply to detector 6. The stabilized power supply and the electric-current limiting unit are designated 61 and 62, respectively, in FIG. 7. D.C. power supply 61 and unit 62 may be provided integrally with main control system 60. A harness is provided which includes electric paths $L_1$ through which the motor drive currents are supplied from the main control system 60 to motors 4, electric paths $L_2$ through which the angular position detection signals are supplied from detectors 6 to main control system 60, and electric paths $L_3$ through which electric power is fed from unit 62 to detectors 6.

Limiting unit 62 includes a current detector 63 and a current control element 64 between its input and output terminals, a smoothing unit 65 and a backward surge bypass diode 66 between the output terminal of unit 62 and ground, and a forward surge bypass diode 67 between the input and output terminals of unit 62. Current detector 63 senses the electric current flowing from power supply 61 to angular position detectors 6. Current control element 64 limits the magnitude of the output current from limiting unit 62, being activated when a signal from current detector 63, indicative of the detected current, exceeds a preset value. Smoothing unit 65 smoothes the output current of current control element 64. Diode 66 absorbs external surges induced in power supply path $L_3$ in one polarity while diode 67 absorbs surges of the opposite polarity, thereby protecting current control element 64 and unit 6 from potentially harmful surges. Current detector 63 senses abnormal or excess currents through power paths $L_3$ due to occurrence of short-circuits in paths $L_3$ or detector 6 and causes current control element 64 to limit the current flowing through paths $L_3$. This prevents overload of paths $L_3$, detector 6 and paths $L_1$ and $L_2$ which may lie side by side close to $L_3$.

The current-limiting operation of current limiting unit 62 causes proportion fluctuations in the voltage applied to detectors 6, which are reflected in fluctuations in the output of detectors 6 in response to current fluctuations from d.c. power supply 61. Such fluctuations will be picked up by AND-gate $G_3$ of the fault detector 50 via comparators 3, which shut down the system if the fluctuations are sufficiently long-lived. This further enhances the safety and reliability of the overall system.

Figure 8:
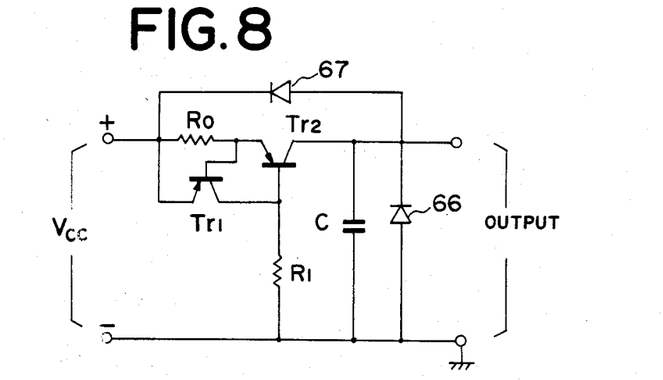
FIG. 8 is a schematic diagram of the current limitting unit of FIG. 7.

FIG. 8 shows details of current limiting unit 62. In this figure, transistor $Tr_1$ with a resistor $R_0$ shunting its base and collector terminals corresponds to current detector 63 of FIG. 7, a transistor $Tr_2$, the base and collector of which are connected respectively to the emitter and base of transistor $Tr_1$, corresponds to current control 64, and a capacitor C corresponds to smoothing control 65. In this configuration, increases in the voltage across resistor $R_0$ results in increased current flow through transistor $Tr_1$ and a resistor $R_1$. This increases the base potential of $Tr_2$, thereby decreasing the current flowing through $R_0$ and $Tr_2$. Thus, if a short-circuit should occur across the output side of current limiting unit 62, so that excessive current flows from the power supply to the load including the current-limiting unit, the current-limiting unit serves to limit current flow. Therefore, the load and the wiring between the power supply and the load are protected from overload due to short circuits.

Figure 9:
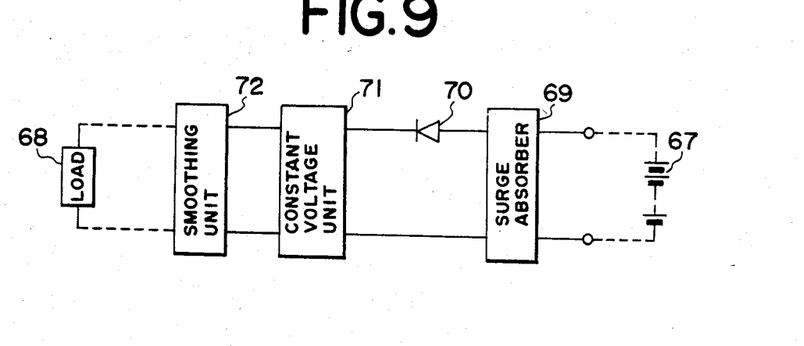
FIG. 9 is a block diagram of the stabilized power supply used in the system of FIG. 1.

FIG. 9 shows the stabilized d.c. power supply unit 61 in more detail. The supply unit includes a high-voltage surge absorber 69, connected to a battery 67, which absorbs surge voltages exceeding a predetermined value to protect from the surge voltages all the components of the control system which constitute a load 68 on battery 67, a back-surge preventive element 70 which prevents a reverse-current from the side of power supply 69 and a negative-polarity surge, a constant-voltage unit or voltage regulator 71 which supplies a constant-voltage to load 68 and a smoothing unit 72 which smoothes ripple voltages in the output of the voltage regulator incidental to the constant-voltage control of voltage regulator 71 and compensates for sudden changes in the current flowing through the drive unit and/or other electrical load in the control system. Power supply 67 may include an electric generator in place of the vehicle battery. Thus, the control system can be shielded from fluctuations in the output voltage of the power supply. In addition, since high-voltage surges likely to be produced in vehicles having an internal combustion engine are absorbed, the components of the control system are protected from damage due to voltage surges.

Figure 10:
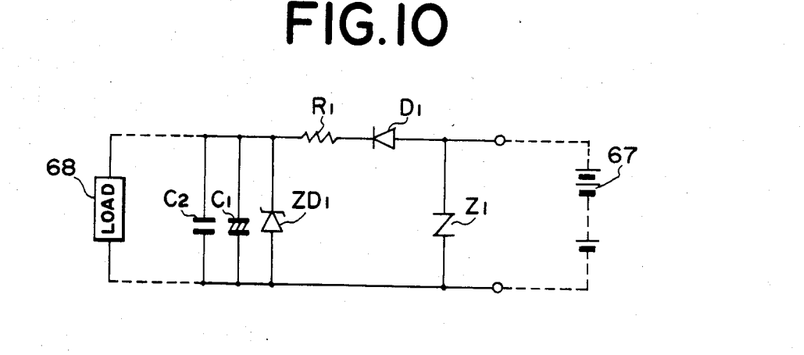
FIG. 10 is a schematic diagram of the power supply of FIG. 9.

FIG. 10 shows a first embodiment of the unit of FIG. 9. A varistor $Z_1$ (surge absorber 69) allows surge current to flow therethrough to bypass the load circuit connected to power supply 67, thereby protecting the load cicuit from surges. A rectifier $D_1$ (back-surge preventive element 70) prevents reverse currents which would be produced when power supply 67 is connected to the load circuit in the opposite polarity to that shown, and also prevents surge currents having negative polarity. A resistor $R_1$ prevents an unchecked flow of load current. A Zener diode $ZD_1$ (voltage regulator 71) is provided between the unstable input power supply 67 and the fluctuating load 68 to ensure a constant voltage across load 68 by causing an excess current, due to the voltage deviation from the constant voltage, to flow through $ZD_1$, thereby bypassing load 68. An electrolytic capacitor $C_1$ and a film or ceramic capacitor $C_2$ (smoothing unit 72) constitute smoothing unit 72.

Figure 11:
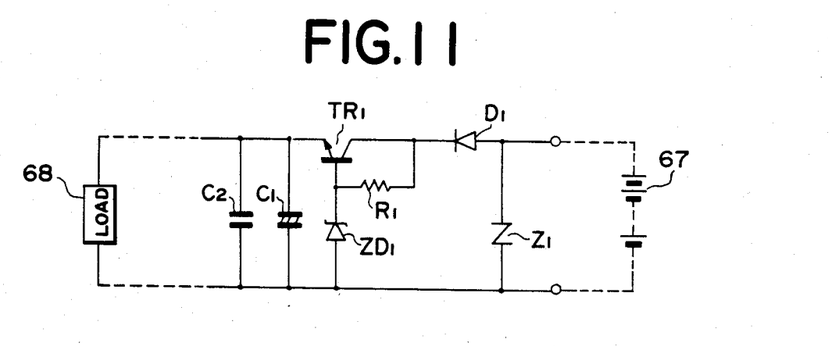
FIG. 11 is a schematic diagram of a modification to the power supply of FIG. 9.

FIG. 11 shows a second embodiment of the unit of FIG. 9. In the second embodiment, voltage regulator 71 includes a transistor $TR_1$, the collector of which is connected to the cathode of diode $D_1$, the base of which is connected to the junction of Zener diode $ZD_1$ and resistor $R_1$, and the emitter of which is connected to load 68. In this embodiment, the junction of Zener diode $ZD_1$ and resistor $R_1$ is not connected to load 68. Thus, changes in the current flowing through diode $ZD_1$ due to load fluctuations are absorbed more reliably by $TR_1$, thereby providing a more stable output current. In other words, $TR_1$ enhances the effects of Zener diode $ZD_1$ and capacitors $C_1$ and $C_2$. The rest of the structure is the same as that of FIG. 10.

Figure 12:
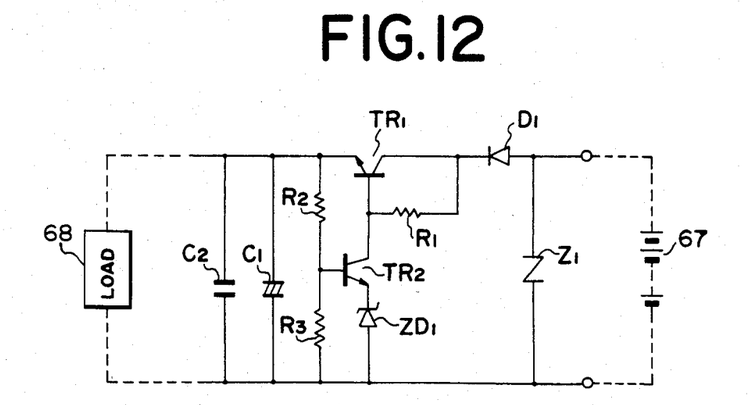
FIG. 12 is a schematic diagram of another modification to the power supply of FIG. 9.

FIG. 12 shows a third embodiment of the unit of FIG. 9. In the embodiment of FIG. 12, voltage regulator 71 further includes a second transistor $TR_2$, the emitter of which is connected to Zener diode $ZD_1$, and the collector of which is connected to the base of transistor $TR_1$, whereby the collector-emitter path of transistor $TR_2$ constitutes the path between diode $ZD_1$ and transistor $TR_1$. The base of transistor $TR_2$ is connected to the junction of series connected dividing resistors $R_2$ and $R_3$ which are connected in parallel with load 68. Thus, changes in the output voltage across $R_2$ and $R_3$ are amplified as a current by transistor $TR_2$, and then the resulting current flowing through the emitter-collector path of $TR_2$ is inputted to the base of transistor $TR_1$. In other words, $TR_1$ produces an output current in accordance with a control signal from $TR_2$, i.e. controls the output current more exactly in a feedback control manner. The arrangement of the other components is the same as in the embodiment of FIG. 11 and description thereof will be omitted.

Figure 13:
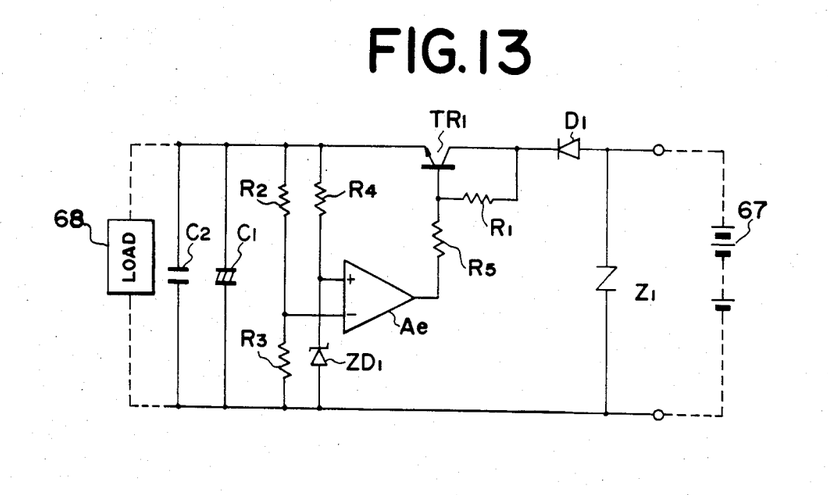
FIG. 13 is a schematic diagram of yet another modification to the power supply of FIG. 9.

FIG. 13 shows a fourth embodiment of the unit of FIG. 9. In FIG. 13, error amplifier Ae is used instead of $TR_2$ of FIG. 12 in order to control the base current of transistor $TR_1$. The plus-input terminal of the amplifier is connected to the junction of Zener diode $ZD_1$ and a current limiting resistor $R_4$ which are connected in parallel with load 68. The minus-input terminal of the amplifier is connected to the junction of resistors $R_2$ and $R_3$. The output of the amplifier is connected via a resistor $R_5$ to the base of transistor $TR_1$. Thus, the difference between a reference voltage determined by $ZD_1$ and $R_4$ and part of the variable output voltage of $TR_1$ derived by $R_2$ and $R_3$ is produced as an error. This error is inputted via resistor $R_5$ to the base of $TR_1$, thereby causing $TR_1$ to compensate for the error. In other words, more exact control of the output current of $TR_1$ results. Of course, the arrangement of other components is the same as in the respective embodiments of the unit of FIG. 12.

While the invention has been described and shown in terms of several embodiments thereof, the invention should not be limited to them. They are given only for the purpose of illustration. Therefore, various changes and variations could be made by those skilled in the art without departing from the scope of the invention as set forth in the attached claims.

What is claimed is:

1. A control system for adjustable shock absorbers, each comprising a damping-force adjusting means, comprising:
    (a) a switch for selecting a desired one of a plurality of damping-force states;
    (b) a selection reference signal generator responsive to the selection of the desired state for producing a corresponding damping-force selection reference signal;
    (c) drive means for driving the damping-force adjusting means of said shock absorber to a desired position at which the desired damping-force is produced by the shock absorber in accordance with the reference signal;
    (d) means for sensing the position of the damping-force adjusting means and producing a detection signal indicative of the position of the damping-force adjusting means;
    (e) said drive means including a comparator for comparing the reference signal with the detection signal and generating a non-coincidence signal when the reference signal does not coincide with the detection signal, thereby driving the damping-force adjusting means until the reference signal and the detection signal coincide, and generating a coincidence signal when the reference signal and the detection signal coincide, thereby stopping the driving of said damping-force adjusting means;
    (f) a fault detector for ouputting an abnormality signal indicative of abnormal adjustment of at least one of said shock absorbers when a time interval from the beginning to the end of the damping-force adjustment process by said damping-force adjusting means exceeds a predetermined value; and
    (g) a damping-force switching signal generator responsive to the abnormality signal from said fault detector for compulsively switching the damping-force selection reference signal to a normal-damping-force selection reference signal, thereby driving said damping-force adjusting means to a predetermined position in response to abnormal shock absorber adjustment.

2. A control system according to claim 1, wherein said fault detector includes a periodic pulse signal generator which produces a periodic pulse signal, a counter which produces said abnormality signal after counting the pulses of said periodic pulse signal from a first count value to a second count value, means responsive to the presence of coincidence signals from all of said comparators for initializing said counter to said first count value, and wherein said damping-force switching signal generator includes means for transmitting said abnormality signal and said selection reference signal to said comparator.

3. A control system according to claim 2, wherein the counter of said fault detector further comprises two counters, the first of which counts pulses of the periodic pulse signal and the second of which counts output pulses from the first counter produced when the first counter has counted a predetermined number of pulses.

4. A control system according to claim 2, wherein said counter further continues to count the pulses of said periodic pulse signal after the second count value for as long as said comparator is producing a non-coincidence signal and produces a system stop signal when said counter has counted to a third count value, said system stop signal serving to stop said control system.

5. A control system according to claim 4, wherein said system includes means for transmitting said selection reference signal and said system stop signal to said drive unit.

6. A control system according to claim 1, wherein said drive means includes an electric motor for driving said adjusting element and a drive unit for driving said electric motor in accordance with the selection reference signal, and a braking unit responsive to said coincidence signal for braking said electric motor.

7. A control system according to claim 6, wherein said braking unit consumes the electrical energy produced by said motor due to its rotation after ceasing to be driven externally.

8. A control system according to claim 7, wherein said drive means includes a transistor having a base connected to the output of said comparator, an emitter connected to ground and a collector connected to a predetermined potential level, and said braking means includes a diode connecting the collector of said transistor to the input terminal of said motor.

9. A control system according to claim 7, wherein said drive means includes a first transistor having a base connected to the output of said comparator, an emitter connected to ground and a collector connected to a predetermined potential level, and wherein said braking means includes a second transistor having a base connected to the collector of said first-mentioned transistor, an emitter connected to the input terminal of said motor and a collector connected to ground.

10. A control system according to claim 1, wherein said drive means includes an electric motor for driving said adjusting element, a drive unit for supplying a drive signal to said motor in accordance with said non-coincidence signal, and a current limiting unit disposed between said motor drive unit and said motor for sensing the magnitude of the drive current supplied from said motor drive unit to said motor and limiting the magnitude of said motor drive current such that the sensed magnitude of said drive current does not exceed a predetermined value.

11. A control system according to claim 1, further including a damping-force indicator unit which comprises a plurality of indicators, one for each of said damping-force selection states, one of said indicators being continuously illuminated in response to the selection of the corresponding one of said damping-force selection state by means of said switch, and an abnormality indication control unit responsive to the abnormality signal from said fault detector for flashing the remaining indicators while continuously illuminating said one of said indicators.

12. A control system according to claim 11, wherein said abnormality indication control unit includes means responsive to both the abnormality signal and a periodic pulse signal for closing and opening a circuit to illuminate said indicators.

13. A control system according to claim 1, further including an electric-current limiting unit provided between said sensing means and a power supply therefor for preventing excess increase in the electric current supplied from said sensing means to said power supply.

14. A control system according to claim 13, wherein said electric-current limiting unit includes a current detector for sensing the magnitude of the current flowing between said sensing means and the power supply, and a current control means responsive to the sensed magnitude of the current for decreasing the magnitude of the current when the sensed magnitude of said magnitude of the current exceeds a predetermined value, thereby preventing overload on said power supply.

15. A control system according to claim 14, further including a smoothing unit for smoothing the output of said current control means.

16. A control system according to claim 14, further including means for absorbing voltage surges across the output terminals of said limiting unit.

17. A control system according to claim 13, wherein said electric-current limiting unit includes a current detector which includes a first resistor having first and second ends and a first transistor having an emitter and a collector, the circuit between said emitter and collector having first and second ends, the first ends of said circuit and said first resistor being connected in common to said power supply, the second end of said first resistor being connected to the base of said first transistor, a current control means which includes a second transistor having an emitter and a collector, the circuit between said emitter and said collector having a first end connected to the second end of said first resistor and a second end, a second resistor connected to the base of said second transistor for controlling the base current of said second transistor, a first diode connecting the first end of said first resistor and said second end of the circuit between said emitter and said collector of said second transistor for absorbing voltage surges between said power supply and the output of said limiting unit, and a second diode for absorbing voltage surges in the output of said limiting unit.

18. A control system according to claim 13, wherein said electric-current limiting unit includes a first resistor with a first end connected to a first terminal of said power supply for said electric-current limiting unit, a second transistor, having an emitter and a collector being connected to the second end of said first resistor and to said sensing means, respectively, a second transistor having an emitter, a base and a collector being connected to said first and second ends of said first resistor and the base of said first transistor, respectively, a second resistor connected between said base of said first transistor and the second terminal of said power supply for said electric-current limiting unit, a capacitor and a diode connected between the collector of said first transistor and the second terminal of said power supply and a diode connected between the first terminal of said power supply and said sensing means.

19. A control system according to claim 1, wherein said system includes a stabilized power supply means for said drive means and other electrical loads in the control system, said stabilized power supply means including a power supply, a high-voltage absorbing unit connected to said power supply for shunting voltage surges exceeding a predetermined value past said drive means and other electrical load in the control system, a reverse-current preventive means connected to said absorbing unit for preventing reverse-polarity surge currents from flowing from the power supply to said drive means and other electrical loads in the control system, a voltage regulator connected to said reverse-current preventive means for regulating the voltage to said drive means and other electrical loads in the control system and means connected to said voltage regulator for compensating for possible sudden changes in the current flowing through said drive means and/or other electrical load in the control system.

20. A control system according to claim 19, wherein said high-voltage absorbing unit includes a varistor.

21. A control system according to claim 19, wherein said reverse-current preventive means includes a rectifier.

22. A control system according to claim 19, wherein said voltage regulator includes a Zener diode.

23. A control system according to claim 19, wherein said voltage regulator includes a constant-voltage diode, a transistor having a base connected to the output side of said constant-voltage diode, said transistor having an output side connected to said drive means and other electrical loads in the control system and an input side connected to said reverse-current preventive means, and a resistor connecting the base to the input side of said transistor.

24. A control system according to claim 19, wherein said voltage regulator includes a first transistor having a base an emitter and a collector, the circuit between said emitter and collector constituting an output current path, a first resistor connecting said power supply to the base of said first transistor, a second transistor, the collector of which is connected to the base of said first transistor, for controlling the base current of said first transistor, a constant-voltage diode connected to the emitter of said second transistor, and means for applying a voltage proportional to the voltage across said drive means and other electrical loads in the control system to the base of said second transistor.

25. A control system according to claim 19, wherein said voltage regulator includes a transistor having a base, an emitter and a collector, the circuit between said emitter and collector constituting an output current path, a first resistor connecting said power supply to the base of said first transistor, means for generating a voltage proportional to the voltage across said drive means and other electrical loads in the control system, an error amplifier having an output terminal connected to the base of said transistor, and two inputs, one connected to a constant reference voltage and the other connected to said generating means.

26. A control system according to claim 19, wherein said smoothing unit includes a capacitor.

27. A control system according to claim 19, further including means for smoothing possible ripple voltages in the output of said voltage regulator.

* * * * *